United States Patent Office 2,697,103
Patented Dec. 14, 1954

2,697,103

REACTION PRODUCT OF A DIENOPHILE WITH A KETAL OR MERCAPTOL DERIVATIVE OF TETRACHLOROCYCLOPENTADIENONE AND THE PROCESS FOR MAKING SAME

Eugene P. Ordas, Chicago, Ill., assignor to Arvey Corporation, a corporation of Illinois No Drawing. Application December 22, 1947, Serial No. 793,319

8 Claims. (Cl. 260—346.6)

This invention relates to valuable new compositions of matter, and to valuable new products derived therefrom which are useful as insecticides and pesticides and which are further useful as intermediates in the production of other new and valuable compounds.

One object of this invention is the production of new classes of compositions of matter suitable for use as insect toxicants.

Another object is the production of insect toxicants having a high degree of solubility in the proper solvents so that they may readily be incorporated in insecticidal formulations.

Another object is the production of insect toxicants possessing relatively low toxicity to warm-blooded animals.

Another object is the production of useful material from a hydrocarbon normally produced as a by-product in the petroleum and coal tar industries.

Additional objects will become apparent from the specification as hereinafter described.

More specifically, this invention relates to the production of ketal or mercaptol derivatives of tetrahalocyclopentadienone, said derivatives having the general formula:

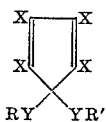

where X is chlorine or bromine, Y is oxygen or sulfur, and R and R' may be the same or two different organic radicals.

This invention further relates to the production of Diels-Alder co-dimers of the foregoing, with a compound having at least one olefinic or acetylenic unsaturated carbon to carbon bond. Non-exclusive examples of the latter compound are cyclopentadiene, maleic anhydride, phenylacetylene, vinyl chloride, and other like generators reactive therewith in the Diels-Alder reaction, and which are generally described as dienophiles possessing a carbon to carbon unsaturated bond.

This invention further contemplates and includes such modifications of aforementioned co-dimer as will result by treatment of same with halogen or sulfuryl halide to produce more highly halogenated derivatives thereof.

Generally, the ketals or their sulfur analogues, the mercaptols, can be prepared by reacting the hexahalo, i. e. chloro, bromo, or mixed chloro-bromo, derivatives of cyclopentadiene with an alkali metal alcoholate or mercaptide, the alkali metal being sodium, potassium, lithium, or the like.

The hexahalocyclopentadiene referred to is intended to include either hexachlorocyclopentadiene, hexabromocyclopentadiene, or a mixed hexachlorobromocyclopentadiene. These materials may be prepared by any means known to the art, such as by appropriate treatment of cyclopentadiene with sodium hypochlorite, sodium hypobromite, etc. For the purpose of clearess of understanding, only hexachlorocyclopentadiene will be hereinafter referred to, although without intended limitation thereto.

The ketal or mercaptol derivatives of tetrachlorocyclopentadienone are prepared by reacting hexachlorocyclopentadiene, respectively, with an alkali metal alcoholate or an alkali metal mercaptide, in the presence of the corresponding alcohol or mercaptan, or a relatively inert solvent or diluent. The solvent or diluent utilized may be an aromatic one such as benzene or toluene, an aliphatic one such as heptane or hexane, or a heterocyclic one such as dioxane, etc. Many other solvents can be used, such as chlorinated hydrocarbons, both aromatic or aliphatic, in nature but a further extension of this list is unnecessary since other suitable solvents will be known to one skilled in the art once apprised of the nature of this invention.

It is desirable, but not essential, that the alcoholate or mercaptide be soluble in the diluent utilized since such solubility will tend to increase the rate of reaction. Consequently, in many cases, it is preferred that the diluent be a solvent, such as the corresponding alcohol or mercaptan of the alcoholate or mercaptide reactant utilized. At any rate, whether or not solubility be attained, agitation is desirable to insure intimate contact of the reactants.

The ratio of the reactants utilized is not critical and generally the stoichiometric amount of two mols of mercaptide or alcoholate per mol of hexachlorocyclopentadiene is preferred. However, an excess of either reactant over the other may be utilized without harmful effects. The amount of solvent or diluent utilized is also not critical but it is desirable that a sufficient quantity be used to insure a workable fluidity in the reaction mixture and it is further desirable that a large excess be avoided because of the dilution effect.

To produce the ketal or mercaptol derivatives previously referred to, the reaction temperature may be within the range of about 0–150° C. and preferably within the range of about 20–70° C. The reaction can generally be accomplished at atmospheric pressure since pressure is not critical to said reaction. Superatmospheric pressures will only be required to that extent necessary to retain the reactants within the reaction vessel. The rate of reaction to produce the ketal or mercaptol derivatives of tetrachlorocyclopentadienone is relatively rapid, and the desired product is generally formed after only a few minutes of contact. It is preferred, especially in the higher temperature ranges to add the alcoholate or mercaptide to the other reactant at a controlled gradual rate. To enhance the yield, the reaction is generally allowed to proceed for about one to about twenty-four hours or longer, and excess time in the absence of excess alkaline material is not deleterious to the product.

Alcoholates or mercaptides having up to about 20 carbon atoms may be used in the process of this invention, and it is preferred said compounds have less than 13 carbon atoms. Alcoholates of primary, secondary, or tertiary alcohols may be utilized, or mercaptides of primary, secondary or tertiary mercaptans may be utilized. The alcoholates or mercaptides may be aliphatic, aromatic, alicyclic, heterocyclic, etc., or may be combinations thereof. Said materials may be substituted, containing halogen, nitro groups, amino groups, cyano groups, alkoxyl groups, and various other functional groups and substituents. Thus, $CH_3ONa$, $C_2H_5OK$,

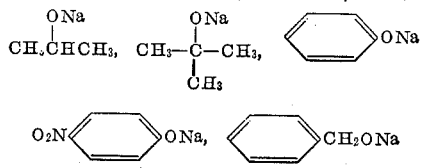

$CH_2Cl–CH_2OLi$, illustrate some of the many alcoholates which are suitable in the preparation of a ketal derivative of tetrachlorocyclopentadienone. Similarly, the sulfur analogs of the above specifically mentioned compounds are eminently suited for preparation of mercaptol derivatives of tetrachlorocyclopentadienone.

The alkali metal mercaptides or alkali metal alcoholates may generally be made by treating the corresponding mercaptan or alcohol with an alkali metal, or with an alkali metal hydroxide, or said mercaptides or alcoholates may be made by any other means known to the art. This invention further contemplates and includes, as non-fully equivalent alternatives, those instances wherein alcoholates or mercaptides are prepared in situ, such as where hexachlorocyclopentadiene is treated with ethanol or ethyl mercaptan in the presence of an alkali metal hydroxide.

The following examples are not intended to restrict the invention in any way but are presented solely to more clearly illustrate the processes thereof.

*Example 1*

To one mol (273 g.) hexachlorocyclopentadiene was added two liters of ethanol (95%) and to this mixture was added two mols (136 g.) sodium ethoxide. The material was allowed to react for 16 hours at room temperature, the precipitated sodium chloride filtered off, and the ethanol was then removed under reduced pressure. The residual oil was fractionated at reduced pressure to yield the product as an oily liquid. By analysis, the material was determined as 1,1-diethoxy-2,3,4,5-tetrachlorocyclopentadiene.

*Example 2*

To one mol (273 g.) hexachlorocyclopentadiene was added two liters of ethanol (95%), and to this mixture 80 g. sodium hydroxide was added portionwise. The mixture thus obtained was stirred for 20 hours at room temperature, filtered, and then fractionated in vacuo. A product which was isolated was identical to the product obtained in Example 1.

*Example 3*

To one mol (273 g.) hexachlorocyclopentadiene was added two liters benzene. The mixture was stirred with mechanical stirrer and then two mols (108 g.) sodium methyl mercaptide was added. The mixture thus obtained was stirred for 30 hours at room temperature, filtered, and fractionated in vacuo, to yield.

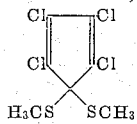

Many interesting and valuable compounds can result from the process hereinbefore disclosed. Mixed ketals or mixed mercaptols (that is, a ketal or mercaptol having the structure hereinbefore represented by formula wherein R and R' are different organic radicals) may be obtained by treating hexachlorocylopentadiene with either two different alcoholates or two different mercaptides. Thus, if hexachlorocyclopentadiene is treated with a mixture of potassium methoxide and potassium ethoxide, under conditions previously disclosed, a compound will result having the following structural formula:

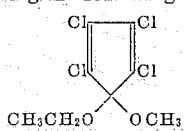

The ketals and mercaptols thus disclosed are useful as chemical intermediates, plasticizers, antioxidants and solvents, and also as intermediates in the production of Diels-Alder adducts, which adducts in turn are useful as insecticides, fungicides, chemical intermediates and impregnants.

The Diels-Alder adducts of the ketals or mercaptols hereinbefore disclosed are prepared in accordance with the known principles of the diene synthesis wherein said ketals or mercaptols are the diene components in the reaction with a dienophile, i. e. a compound having an unsaturated C to C bond such as an olefinic or acetylenic material reactive therewith in the Diels-Alder synthesis.

This reaction is graphically illustrated as follows:

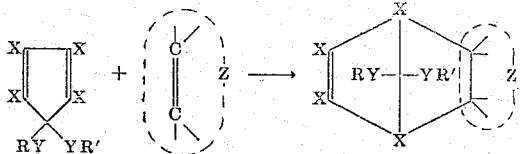

wherein X is chlorine or bromine, Y is oxygen or sulfur, R and R' are the same or different organic radicals having less than 21 carbon atoms and Z is a dienophile. The dienophile may have more than one unsaturated bond and may be aliphatic, alicyclic or heterocyclic, substituted or unsubstituted, or, in fact, may have any structure which is known to be a dienophile. Some common specific examples of such compounds are: cyclopentadiene, cyclopentene, butadiene, styrene, phenylacetylene, fulvenes, acrolein, benzoquinone, maleic anhydride, acrylic acid, crotonaldehyde, isoprene, ethylene.

The Diels-Alder reaction herein concerned is accomplished in the same manner as taught by the prior art for similar reactions. Thus, the temperature of reaction will vary with the dienophile and diene utilized and no catalyst is necessary. Pressure is not critical and only those pressures necessary to retain the reactants within the reaction vessel are necessary. Similarly, ratio of reactants is not critical, although equal molar ratios of reactants or a slight excess of dienophile may be preferred. A relatively inert solvent or diluent may be used when desirable, for example, benzene, toluene, carbon tetrachloride, chloroform, hexane, heptane, and ethanol are all suitable. Many other solvents or diluents can be used, and it is desirable, but not essential, that they be relatively low boiling to facilitate removal from the reaction product by distillation.

Regarding the temperature of reaction, the optimum will generally not exceed about 200° C. and temperatures below about 0° C. will generally not be required. The temperatures at which the reaction will proceed will be consistent with the physical and chemical properties of the reactants utilized.

To more clearly illustrate the adduction of a dienophile with a mercaptol or ketal of tetrachlorocyclopentadienone, the following specific examples are listed. These examples are not to be construed as limiting the invention in any way.

*Example 4*

5.84 grams of the diethyl ketal derivative of tetrachlorocyclopentadienone was mixed with 5 cc. hexane, and to this mixture was added 1.50 g. of cyclopentadiene. The mixture was allowed to stand overnight at room temperature and the expected Diels-Alder co-dimer of the aforementioned ketal and cyclopentadiene was isolated as a white crystalline solid.

*Example 5*

A mixture of 1,1-diethoxy-2,3,4,5-tetrachlorocyclopentadiene and 0.5 g. maleic anhydride was placed in a test tube and heated in an oil bath. The temperature was slowly raised and the maleic anhydride fused at about 65–70° C. When the bath temperature was 125° C., the temperature of the reaction mixture rose to about 145° C. The mixture was then allowed to cool slowly and the reaction mass solidified. Recrystallization of the solidified mass from a 50–50 mixture of benzene and hexane yielded a colorless crystalline material melting at about 213–215° C.

|  | C | H | Cl |
|---|---|---|---|
| Analysis | 40.22 | 3.22 | 36.8 |
| Computed for $C_{13}H_{12}O_5Cl_4$ | 40.00 | 3.08 | 36.4 |

The material is thus the expected Diels-Alder co-dimer of 1,1-diethoxy-2,3,4,5-tetrachlorocylopentadiene and maleic anhydride.

These new compounds, namely, the aforementioned co-dimers, may be utilized in the control and destruction of insects in the form of oil sprays, dusts, aqueous emulsions, aerosols, and the like carriers, either alone or in association with any other desired toxicants.

Said co-dimers are further valuable in that they may be more highly halogenated, either by halogenation with halogen such as chlorine or bromine, or with sulfuryl halides such as sulfuryl chloride or sulfuryl bromide, by means and in manners which are known to the art.

Although this application has heretofore been restricted in description to preparations wherein the starting material has been a hexahalocyclopentadiene, it will be apparent that monoalkylpentahalocyclopentadienes, as hereinafter described, are substantially equivalent provided the alkyl substituent is on a carbon atom other than that of the methylene group. Thus, compounds such as

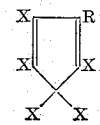

and

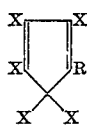

wherein X is chlorine or bromine and R is an ethyl or methyl radical are applicable to the process of this invention as described, and if used will result in similar products, being different only in that an alkyl group as described will be attached to the pentadiene ring in place of one halogen.

I claim as my invention:

1. A new composition of matter having the formula

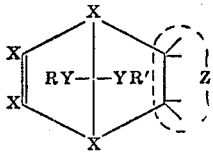

where X is of the group consisting of chlorine, bromine and mixtures thereof; Y is of the group consisting of oxygen and sulfur; R and R' are the same or any different organic radicals containing less than 21 carbon atoms; and Z is a dienophile possessing a carbon to carbon unsaturated bond from the group consisting of cyclopentadiene, maleic anhydride, phenylacetylene, vinyl chloride, cyclopentene, butadiene, styrene, fulvene, acrolein, benzoquinone, acrylic acid, crotonaldehyde, isoprene, and ethylene.

2. A method of producing a new composition of matter which comprises reacting a hexahalocyclopentadiene wherein the halogen substituents are of the group consisting of chlorine, bromine or mixtures thereof with a compound of the group consisting of alkali metal alcoholates and alkali metal mercaptides wherein said alkali metal compounds contain less than 21 carbon atoms at a temperature of from 0 to 150° C. and reacting the resulting derivative of tetrahalocyclopentadienone with a dienophile possessing a carbon to carbon unsaturated bond at a temperature of from 0 to 200° C. to form their Diels-Alder adduct.

3. A method of preparing the Diels-Alder adduct of a ketal derivative of a tetrahalocyclopentadienone wherein the halogen substituents are of the group consisting of chlorine, bromine or mixtures thereof, and wherein the ketal was formed by reacting a hexahalocyclopentadiene with alkali metal alcoholate containing less than 21 carbon atoms, and a dienophile possessing a carbon to carbon unsaturated bond which comprises reacting said ketal and said dienophile at a temperature of from 0 to 200° C.

4. A method of preparing the Diels-Alder adduct of a mercaptol derivative of a tetrahalocyclopentadienone wherein the halogen substituents are of the group consisting of chlorine, bromine or mixtures thereof, and wherein the mercaptol was formed by reacting a hexahalocyclopentadiene with alkali metal mercaptide containing less than 21 carbon atoms, and a dienophile possessing a carbon to carbon unsaturated bond which comprises reacting said mercaptol and said dienophile at a temperature of from 0 to 200° C.

5. The process for the preparation of dienophilic addition compounds which includes: reacting a dialkyl ketal of tetrachlorocyclopentadienone of a dienophilic olefinic compound at a temperature up to 200 degrees centigrade.

6. The process for the preparation of dienophilic addition compounds which includes: reacting a dialkyl ketal of tetrachlorocyclopentadienone with maleic anhydride at a temperature up to 200 degrees centigrade.

7. As a new composition of matter the Diels-Alder codimer of 1,1-diethoxy-2,3,4,5-tetrachlorocyclopentadiene and maleic anhydride.

8. As a new composition of matter the Diels-Alder codimer of 1,1-diethoxy-2,3,4,5-tetrachlorocyclopentadiene and cyclopentadiene.

References Cited in the file of this patent

UNITED STATES PATENTS

| Number | Name | Date |
|---|---|---|
| 2,421,597 | Bruson | June 3, 1947 |
| 2,426,948 | Wells | July 29, 1947 |
| 2,552,567 | McBee et al. | May 15, 1951 |
| 2,562,893 | Dawson | Aug. 7, 1951 |

OTHER REFERENCES

Prill, "Jour. Am. Chem. Soc.," Jan. 1947, vol. 69, pp. 62, 63.

Krynitsky et al., "Jour. Am. Chem. Soc.," Aug. 1947, vol. 69, pp. 1918–20.